United States Patent [19]
Brushenko

[11] 3,819,442
[45] June 25, 1974

[54] ALIGNMENT TECHNIQUES FOR FIBER BUNDLES

[75] Inventor: Anatoli Brushenko, Elmhurst, Ill.

[73] Assignee: The United States of America as represented by the Secretary, Department of Health Education and Welfare, Washington, D.C.

[22] Filed: Apr. 4, 1972

[21] Appl. No.: 241,008

[52] U.S. Cl. ............ 156/180, 65/4, 156/250, 156/291, 156/296, 156/306, 156/441, 156/516, 350/96 B
[51] Int. Cl. ............................................ G02b 5/14
[58] Field of Search .......... 156/166, 180, 250, 306, 156/290, 291, 296, 433, 441, 516, 543, 548, 549, 175; 65/4; 350/96 B

[56] References Cited
UNITED STATES PATENTS

| | | | |
|---|---|---|---|
| 3,104,191 | 9/1963 | Hicks. Jr. et al. | 156/180 |
| 3,188,188 | 6/1965 | Norton | 65/4 |
| 3,193,363 | 6/1965 | Hicks. Jr. et al. | 156/296 |
| 3,465,432 | 9/1969 | Crimmins | 156/55 |
| 3,505,046 | 4/1970 | Phaneuf | 350/96 B |
| 3,508,589 | 4/1970 | Derick et al. | 350/96 B |
| 3,514,351 | 5/1970 | Mukai | 156/175 |
| 3,570,334 | 3/1971 | Ball | 350/96 B |
| 3,599,679 | 8/1971 | Carter | 161/175 |
| 3,607,560 | 9/1971 | Peck | 156/175 |
| 3,741,839 | 6/1973 | Komiya | 156/175 |
| 3,743,560 | 7/1973 | Western | 156/181 |

OTHER PUBLICATIONS

Wielar, Application Serial No. 113,563, filed Feb. 8, 1971, laid open to Public Inspection on 7-18-72 as noted at 900 OG 816, pp. 1-7.

*Primary Examiner*—Daniel J. Fritsch

[57] ABSTRACT

An alignment technique for fiber bundles using a multiple square orifice which involves threading plastic or glass fibers from multiple spools through a convergent multiple orifice made of converging glass tubes or a metal grid perforated with square or rectangular holes. The aligned bundle is then passed through a sizing aperture and either binder is applied or the fibers are fused together at predetermined intervals therealong. The aligned bundles may then be cut to the desired length.

8 Claims, 2 Drawing Figures

PATENTED JUN 25 1974 3,819,442

3,819,442

ALIGNMENT TECHNIQUES FOR FIBER BUNDLES

BACKGROUND OF THE INVENTION

The present invention relates to the alignment of fiber bundles and, more particularly, to a method of aligning optical fibers for use in fiber optic instruments.

The field of fiber optics is growing rapidly and is proving to be extremely important in the development of medical diagnostic instruments, as well as in other areas. This is true because the unique characteristics of fiber optics permit both light and image transmission through irregular configurations.

An optical fiber, sometimes known as a light guide or a light pipe, is a thin transparent core made out of a high refractive index material coated with a material of a relatively lower refractive index. The core material may be either glass or plastic. Optical fibers have the unique property of transmitting light flux from one end to the other with very low losses.

To transmit an image, an aligned bundle is made out of many fibers. The ends of each bundle are either fused or potted with an adhesive, such as epoxy-resin, so that they may be ground and polished. An image is formed by a lens on one end of the bundle and transmitted to the other end, where it is viewed. If housed in a suitable protective sheath, such a bundle may be used to examine inaccessible or remote places, such as inside the human stomach (gastroscope) or colon (proctoscope). Naturally, it is extremely important for such an instrument in the above application to be highly flexible.

The more fibers in a given size bundle, the better the resolution or image quality. High resolution requires very thin fibers. The handling of such fibers, however, becomes increasingly difficult as the diameter of the fibers becomes smaller, and multiple fibers have been developed to relieve this problem. Such multiple fibers are really fibers within a fiber. A multiple fiber can have a relatively large cross-section, e.g. 0.003 by 0.003 inch, which can be handled easily, but it may contain 100 or more cores optically insulated from one another.

Multiple fibers are normally made by drawing coated rods in a vertical hollow furnace using pulling rollers. These rods are assembled into a square cross-section bundle and drawn into a fiber. The square cross-section is advantageous so that these fibers can be assembled into a coherent, image transmitting bundle with a minimum of dead spaces. Also with a square cross-section, twists can be easily controlled during assembly. Nevertheless, other configurations can also be easily prepared.

Prior art methods of aligning fibers, be they single core fibers or multiple fibers, have suffered from several deficiencies. One previous approach to fiber alignment is to wind the fiber on a large diameter drum with a channel cut in it. The size of the channel determines the cross-section of the bundle. The fiber is wound in this channel using a reciprocating cam guide, similar to a sewing machine bobbin. The bundle is then potted with an adhesive at several places and then cut and removed from the drum.

Although in this method the bundle can be wound rather rapidly, a major disadvantage is that as the layers are built up a considerable amount of dead space and unevenness develop. This is due to the criss-crossing of fibers as the direction of the fiber guide changes. When a given layer is made in one direction and then the direction is reversed for the next layer, the fibers must cross one another. Since there is no deformation in the fibers, as in sewing machine thread, the nonuniformity or unevenness accumulates, and progressively increases as the layers build up.

A second prior art method of aligning fibers is to make a single layer of fibers on a large, smooth drum. A binder is then applied and the layer is removed from the drum and cut into strips or ribbons from which the bundle is made in a channel-like fixture. The problem with this approach is that when individual layers are placed on top of one another, care has to be taken that there is no slippage of layers and no shear lines. This process is also very tedious and time consuming.

SUMMARY OF THE INVENTION

The present invention avoids all the problems of the prior art. The individual fibers or multiple fibers are fed from their spools through a grid or orifice system. They come through this grid properly aligned. At this point the bundle is potted at intervals with binders and passed through a sizing aperture, or is first passed through a sizing aperture to bring the bundle into its final configuration and then fused at intervals. The aligned bundle is then cut into desired lengths. The completed fiber bundle may be used in various devices, e.g. a flexible endoscope of the type shown in U.S. Pat. No. 3,572,325.

Accordingly, it is an object of the present invention to overcome the deficiencies of the prior art.

It is another object of the present invention to provide for improved aligning of fiber bundles.

It is a further object of the present invention to provide improved fiber bundles.

It is yet another object of the present invention to provide a fast, efficient and inexpensive alignment technique by which fiber bundles may be fabricated continuously and with a minimum of dead space and shear lines.

It is another object of the present invention to provide an automatic or semi-automatic method of aligning optical fibers.

It is yet another object of the present invention to provide an alignment technique which eliminates tedious labor and lengthy time requirements.

It is still another object of the present invention to provide an alignment technique utilizing a metal grid with square holes therethrough or a convergent orifice made of multiple glass tubes arranged in the alignment that the final bundle of fibers is to take.

BRIEF DESCRIPTION OF THE DRAWING

These and other objects will become more clear from a reading of the following description of specific embodiments of the invention in conjunction with the drawing, in which.

DESCRIPTION OF SPECIFIC EMBODIMENT

Figure 1:
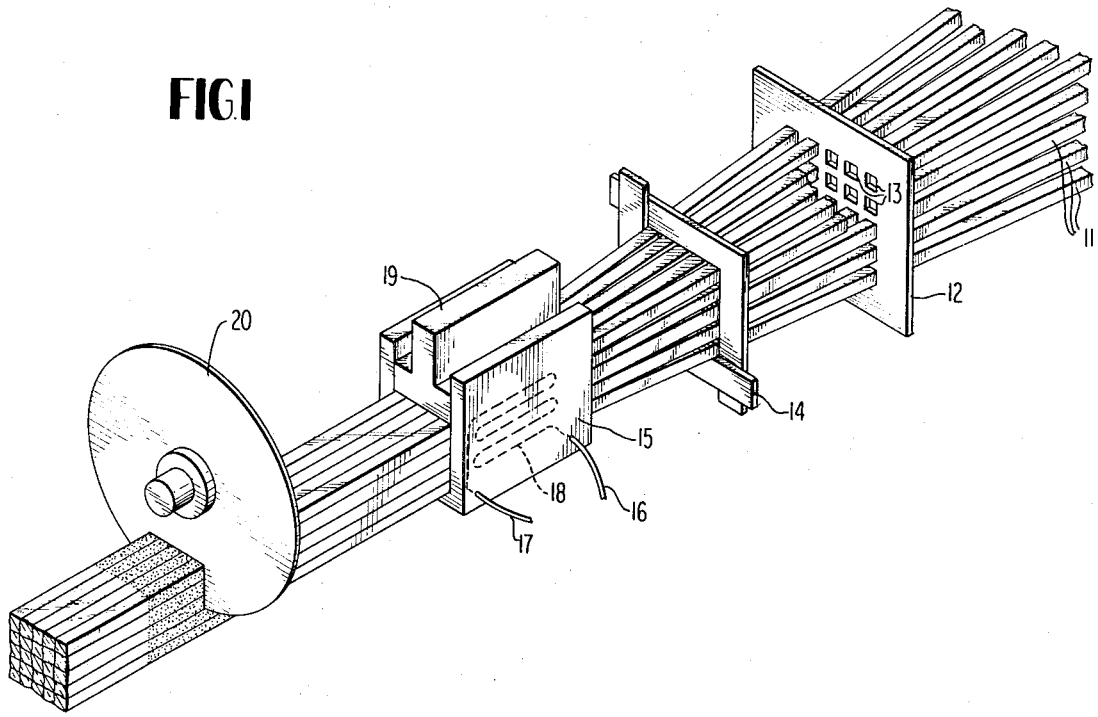
FIG. 1 is a diagrammatic view of one embodiment of the process of the present invention using a metal grid.

In FIG. 1 there is shown optical fibers 11, either of the single core type or multiple type, being fed from individual spools (not shown). The multiple type fibers are, of course, pre-coated, and the single core type may be either precoated or they may be coated with the low refraction index material after leaving the spools.

For the sake of simplicity, 25 fibers are shown and so 25 spools of fibers would be utilized. It should be understood that in actual operation many more fibers would be used. If multiple fibers of 0.010 × 0.010 inch cross-section are used, and a one-eighth inch square bundle was desired, 144 spools of fiber would be needed.

Each fiber 11 is threaded through an orifice 13 of a metal grid 12. The orifices 13 are preferably square when multiple fibers are used but may be round or of any other desired shape. The apertures 13 are preferably slightly larger than the fibers 11 so that any imperfection that might appear on the fiber, as an enlarged diameter, for instance, will pass therethrough without catching on the aperture and resulting in a broken fiber.

The fibers 11 then pass through a sizing aperture 14 to bring the fibers 11 into contact with one another and to bring the fiber bundle into a dimension closely approximating the final outside dimensions. The sizing aperture 14 may preferably be adjustable so that it has greater versatility.

The fibers 11 in an aligned bundle then pass through a fusing channel 15. Within the fusing channel is a heating element 18 with leads 16 and 17 to a suitable power supply. Pressure is applied during the fusing operation to the fibers 11 by a suitable pressure applicator 19. Downstream of the pressure channel 15 is a cut-off saw 20 for cutting the aligned and fused fiber bundles to the proper lengths.

The grid 12 may be made of any suitable material as, for instance, stainless steel, 0.010 inch thick. The orifices in the gird may be made, for example, using a photoetching technique. The sizing aperture may be made out of a one-sixteenth inch metal plate. It may have merely a square hole, or it may be adjustable. It may also be spring loaded against the bundle.

In operation, the fibers 11 are drawn through the orifices 13 in the grid 12 and are sized by the sizing aperture 14. At predetermined intervals, representing the desired length of the completed fiber bundle, the travel of the fibers 11 is stopped and the fibers 11 are fused in the fusing channel 15 by a combination of heat from heating element 18 and pressure from pressure applicator 19.

The cut-off saw 20 is placed the same distance from the fusing channel 15 as the length of the predetermined intervals. While the fibers 11 are being fused at the fusing channel 15, the bundle is cut by the saw 20. The cut is made in the middle of the fused region so as to form two fused ends which represent the end of one bundle and the beginning of another. The middle of each bundle is left loose to assure the flexibility of the completed bundle.

Figure 2:
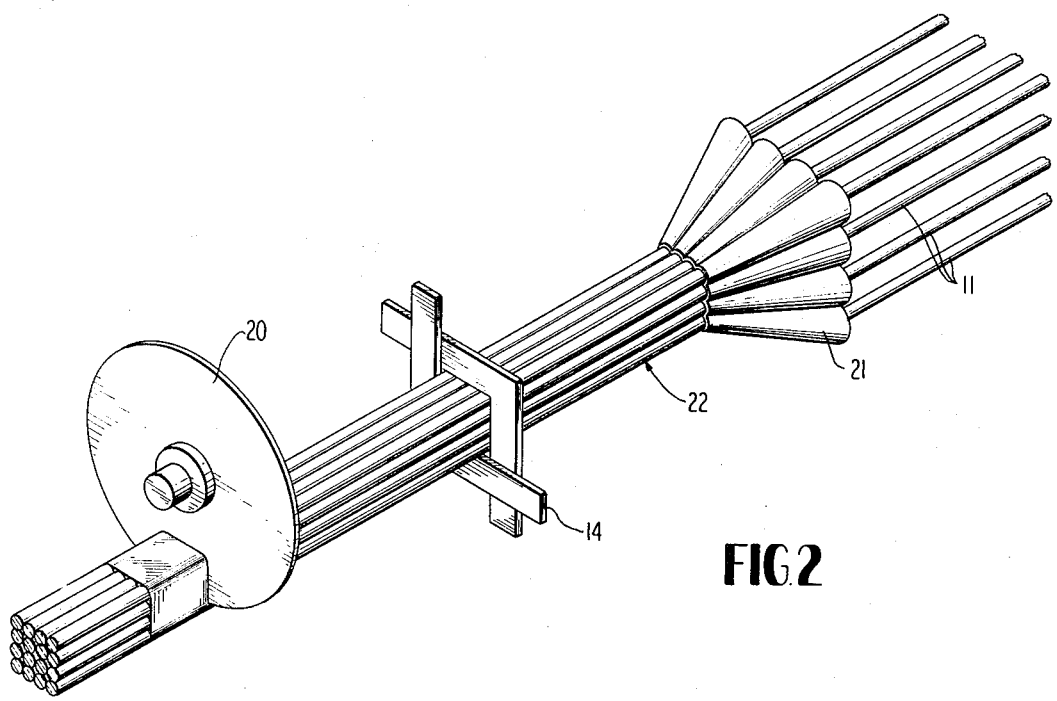
FIG. 2 is a diagrammatic view of another embodiment of the process of the present invention using a convergent multiple orifice.

The embodiment shown in FIG. 2 is similar to that of FIG. 1 except a convergent multiple orifice 21 is used in place of grid 12 and serves to both align and converge the fibers 11. In FIG. 2 there is schematically shown a location for the application of binder which may be used in place of fusing the fibers, although it will be understood that binder or fusion may be used in either embodiment.

The convergent multiple orifice 21 is preferably, for ease of fabrication, made of glass, although it could be made of plastic or metal with more difficulty. This convergent multiple orifice 21 may be fabricated from thin wall glass tubes, e.g. of 0.050 inch OD. These tubes, in a number equal to the number of fibers to be aligned by the orifice, are cut to an appropriate length, e.g., 8 inches, and placed into a fusing fixture. To insure that the tubes are not deformed during the fusing operation, soft glass rods are inserted into the interstitial spaces. The above assembly is placed inside a furnace and the temperature raised to the softening point of the glass rods. Since the softening point of the glass rods is significantly lower than that of the glass tubes, the assembly is fused together without deforming the tubes.

Next, the fused assembly is placed in a fiber drawing machine such as a vertical furnace. To prevent the tubes from collapsing or distorting, low positive air pressure may be applied to the inside of the tubes from the top of the assembly. The tubes are then drawn into a truncated cone or truncated pyramid shape.

In the embodiment of FIG. 2, the fibers 11 from individual spools (not shown) pass through the convergent multiple orifice, and as they exit therefrom such fibers are preferably not quite in contact with one another. At station 22 an adhesive binder, such as epoxy or acrylic resin, is applied to the fibers. The fibers 11 are then pulled through a sizing aperture 14 to bring them in contact with one another and finally they are cut by a cut-off saw 20. The adhesive may be applied continuously, but is preferably applied only intermittently at locations corresponding to the length of cut of the bundles by the saw 20.

The operation of this embodiment is very similar to the operation of the embodiment of FIG. 1. After the fibers 11 pass through the convergent multiple orifice 21, the travel is stopped at predetermined intervals and binder is applied at the station 22. The fibers 11 are then brought to the correct final size by passing through the sizing aperture 14. The cut-off saw 20 again cuts the fiber bundles in the middle of each bound portion to leave the middle of each bundle loose and flexible.

Each of these systems lends itself to the high speed economical production of aligned bundles. Either glass fibers or plastic fibers may be used in the present invention. The preferable method of binding glass fibers is with epoxy resin binder and the preferable method of binding plastic fibers is by fusion. Either single core or multiple plastic fibers can be used in the present invention. The metal grid is preferred to the convergent multiple orifice when multiple fibers are used.

The fibers may be made of any material suitable for fiber optic application. One example is a core of polystyrene with a refractive index of 1.56 and an acrylic resin coating with a refractive index of 1.49. Those of ordinary skill in the art of fiber optics are well aware of suitable materials from which optical fibers may be made.

It should be understood that the invention is not limited to the specific means, process and materials described herein, but that modifications and variations may be made without departing from the invention. For example, where binder is applied it may be provided downstream from the sizing aperture using a vacuum or pressure impregnating apparatus.

What is claimed is:

1. A method of making optical fiber bundles having a predetermined configuration of fibers therein for use in fiber optic instruments, comprising the steps of:
   passing a plurality of multiple filament optical fibers through an alignment means having a plurality of orifices therein aligned in the same configuration as the predetermined configuration of the fiber bundle;
   binding the fibers together only at portions separated by predetermined intervals along the length of the aligned fibers; and cutting the aligned fibers within each bound portion.

2. A method of making fiber bundles in accordance with claim 1 wherein:
   said binding step is accomplished by passing the aligned fibers through a sizing aperture to bring the fibers into contact with one another and then through a fusing means for fusing the fibers together and then fusing the fibers at said predetermined intervals.

3. A method of making fiber bundles in accordance with claim 1 wherein:
   said binding step is accomplished by applying a binding adhesive to said fibers at said predetermined intervals after they leave said alignment means and then passing the fibers through a sizing aperture to bring the fibers into contact with one another and cause the fibers to be bound at said predetermined intervals.

4. An apparatus for making optical fiber bundles having a predetermined configuration of fibers therein for use in fiber optical instruments, comprising:
   an alignment means having a plurality of aligned orifices for receiving a plurality of multiple filament optical fibers and aligning them in the same configuration as the predetermined configuration of the fiber bundle;
   binding means downstream of said alignment means for binding the fibers together at portions therealong separated by predetermined intervals; and
   cutting means downstream from said binding means for cutting the aligned fibers within each bound portion.

5. An apparatus in accordance with claim 4, wherein:
   said alignment means comprises a metal grid having a plurality of orifices therethrough aligned in the same configuration as the predetermined configuration of the fiber bundle.

6. An apparatus in accordance with claim 4, wherein:
   said alignment means comprises a convergent multiple orifice comprising a plurality of fused truncated-cone-shaped tubes aligned in the same configuration as the predetermined configuration of the fiber bundle.

7. An apparatus in accordance with claim 4, wherein:
   said binding means comprises a sizing aperture to bring the fibers into contact with one another and fusing means downstream from said sizing aperture for fusing the fibers together.

8. An apparatus in accordance with claim 4 wherein:
   said binding means comprises applicator means for applying a binding adhesive to the fibers and a sizing aperture to bring the fibers into contact with one another downstream from said applicator means.

* * * * *